US009286521B2

(12) United States Patent
Englander

(10) Patent No.: US 9,286,521 B2
(45) Date of Patent: *Mar. 15, 2016

(54) CAMERA SYSTEM FOR LARGE VEHICLES

(71) Applicant: Rosco Inc., Jamaica, NY (US)

(72) Inventor: Benjamin Englander, Woodmere, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,954

(22) Filed: Jan. 7, 2014

(65) Prior Publication Data

US 2014/0192196 A1  Jul. 10, 2014

Related U.S. Application Data

(63) Continuation of application No. 13/177,302, filed on Jul. 6, 2011, now Pat. No. 8,624,716, which is a continuation of application No. 11/936,360, filed on Nov. 7, 2007, now Pat. No. 8,004,394.

(60) Provisional application No. 60/857,250, filed on Nov. 7, 2006, provisional application No. 60/913,580, filed on Apr. 24, 2007.

(51) Int. Cl.
*B60Q 1/26* (2006.01)
*G06K 9/00* (2006.01)
*B60Q 1/24* (2006.01)
*B60Q 1/52* (2006.01)
*B60Q 5/00* (2006.01)
*B60R 1/00* (2006.01)
*H04N 7/18* (2006.01)

(52) U.S. Cl.
CPC .............. *G06K 9/00791* (2013.01); *B60Q 1/24* (2013.01); *B60Q 1/525* (2013.01); *B60Q 5/006* (2013.01); *B60R 1/00* (2013.01); *H04N 7/181* (2013.01); *B60R 2300/102* (2013.01); *B60R 2300/103* (2013.01); *B60R 2300/105* (2013.01); *B60R 2300/406* (2013.01); *B60R 2300/70* (2013.01); *B60R 2300/8026* (2013.01)

(58) Field of Classification Search
CPC .......... B60R 1/00; B60R 1/008; B60R 11/04; G06K 9/00791; B60Q 1/24; B60Q 1/525; B60Q 5/006; H04N 7/181
USPC .................... 340/433, 435, 901; 348/148, 159
See application file for complete search history.

(56) References Cited

U.S. PATENT DOCUMENTS

| 4,679,758 | A | * | 7/1987 | Boddy et al. | .................. | 248/479 |
| 5,493,269 | A | * | 2/1996 | Durley et al. | ................. | 340/433 |
| 5,555,019 | A | * | 9/1996 | Dole | .............................. | 348/148 |
| 5,642,238 | A | * | 6/1997 | Sala | ............................... | 348/148 |

(Continued)

*Primary Examiner* — Thomas Mullen
(74) *Attorney, Agent, or Firm* — Stroock & Stroock & Lavan LLP

(57) ABSTRACT

A vehicle-borne camera-based observation system for monitoring areas adjacent a vehicle or passenger vehicle, such as a bus or schoolbus, is disclosed, to provide safer operation for passersby, including for children, and driver convenience. The system includes several cameras, and several monitors in a driver's area displaying all of the fields of view from the cameras, such that each monitor may be controllable to show either the field of view of a first camera or a field of view of a second camera, according to a driver selection or according to an automatic selection. Night vision, automatic tracking, and illumination systems are also provided.

33 Claims, 10 Drawing Sheets

(56) References Cited

U.S. PATENT DOCUMENTS

| | | | |
|---|---|---|---|
| 5,874,989 A * | 2/1999 | O'Brien et al. | 348/148 |
| 5,926,210 A * | 7/1999 | Hackett et al. | 348/152 |
| 6,115,651 A * | 9/2000 | Cruz | 340/435 |
| 6,690,268 B2 * | 2/2004 | Schofield et al. | 340/438 |
| 2003/0080877 A1 * | 5/2003 | Takagi et al. | 348/148 |
| 2003/0197660 A1 * | 10/2003 | Takahashi et al. | 345/7 |
| 2005/0174429 A1 * | 8/2005 | Yanai | 340/435 |
| 2005/0195383 A1 * | 9/2005 | Breed et al. | 356/4.01 |
| 2005/0278088 A1 * | 12/2005 | Thorner | 701/28 |
| 2007/0097212 A1 * | 5/2007 | Farneman | 348/143 |

* cited by examiner

CAMERA SYSTEM FOR LARGE VEHICLES

CROSS REFERENCE TO RELATED APPLICATIONS

The present application is a continuation of U.S. patent application Ser. No. 13/177,302, filed on Jul. 6, 2011, now U.S. Pat. No. 8,624,716, which is a continuation of U.S. patent application Ser. No. 11/936,360, now U.S. Pat. No. 8,004,394, which claims priority to U.S. Provisional Patent Application No. 60/913,580, filed Apr. 24, 2007, and which claims priority to U.S. Provisional Patent Application No. 60/857,250, filed Nov. 7, 2006, the entire contents of which are hereby incorporated by reference herein.

FIELD OF THE INVENTION

The present application generally related to systems for enhancing a vehicle driver's view and systems for vehicle safety, including school bus safety.

BACKGROUND OF THE INVENTION

Operating a vehicle, such as a larger passenger vehicle, entails particular difficulties and risks to the safety of the vehicle and the passengers boarding and disembarking from the vehicle. School buses post particular challenges because society has set high standards for protecting children. Federal regulations and the regulations of other countries require that school buses meet safety requirements. Regulation FMVSS 111 for school buses requires that a driver sitting in the driver's seat see clearly 16 cylindrical drums placed at various key spots around the vehicle, as shown in FIG. 1. Drums 51a-51n and 51p, according to the regulations, are typically one foot diameter by one foot tall cylindrical drums, while drum 51q is a cylindrical drum that is one foot diameter by three feet tall. The regulations require that the driver must clearly see each of these drums. Conventionally, mirrors are attached to various parts of the exterior of the vehicle to enhance the driver's view.

Mirrors, however, present their own challenges. First, a mirror and the arm or arms on which it is mounted protrudes away from the vehicle. Mirrors thus can be impact targets when the vehicle is in motion or is stationary. Also, the mirrors and the assemblies on which they are mounted may introduce drag and may thus decrease fuel economy.

Also, mirrors do not provide a unified view inside the cabin for the driver. For example, if a conventional cross-view mirror is attached to the right side of the vehicle at the front and a second mirror is attached on the left side of the vehicle at the front, then in order to check that the vehicle has clearance on both sides and that no passerby are in harm's way on both sides, the driver must look in opposite directions, to the right and then to the left, then ahead before proceeding, or perhaps even repeat this process. Also, the driver must look outside of the cabin to view the mirrors positioned on the exterior of the vehicle, which necessitates looking through the side windows or a windshield, which may be dirty or wet or covered with snow or the like.

Further, different drivers will require mirrors set at different settings, or heights, depending on the driver's height and head position with respect to the driver's cabin. Therefore, each driver will need to adjust or re-adjust the external minors according to his or her body type or driving posture.

In addition, the mirrors will be typically quite dark in the early morning hours or in the evening hours. Also, the driver's eyes will have to adjust to the different lighting conditions as the outside lighting changes throughout the day. Further, the driver may have to contend simultaneously with different lighting conditions, since the field of view of one of the external mirrors may be well lit at any particular time while the field of view of another mirror may be poorly lit or not lit at all. One or more of the foregoing issues, and other related issues, are addressed by aspects of a system according to the present invention.

Camera systems have been used in the interiors of school buses. As an example, the present assignee describes an interior camera and a protective closure therefor in its U.S. Pat. No. 5,455,625. The present disclosure focuses, however, on an exterior camera system layout and driver controls which affords a view substantially 360° around the school bus. The camera configuration of the present disclosure provides an arrangement of individual cameras, different from anything that would be typically provided on any other type of vehicle.

SUMMARY OF THE DISCLOSURE

A vehicle-borne camera-based observation system for monitoring areas adjacent a vehicle is disclosed. The system includes at least four cameras that provide a 360-degree viewing angle around the vehicle and display the views of the cameras on a plurality of monitors arranged in the driver's area within convenient visual range of the driver. The system may include several cameras, including a forward view camera positioned to have a first field of view including an area in front of the vehicle, a right rear view camera positioned to have a second field of view including an area along a right side of the vehicle, a left rear view camera positioned to have a third field of view including an area along a left side of the vehicle, a right side camera positioned to have a fourth field of view including the area along the right side of the vehicle, a left view camera positioned to have a fifth field of view including the area along the left side of the vehicle, and a back view camera positioned to have a sixth field of view including an area behind the vehicle; and several monitors positioned in a driver's area and operable to display all of the fields of view from the cameras, the several monitors including a first monitor operable to provide driver selection between displaying only the first field of view and only the sixth field of view. The system may include a pair of cameras positioned on either side of the vehicle near the rear side of the vehicle, for example near the corner of the vehicle where the side meets the rear side, each camera of the pair of cameras looking forward and to the side to provide a viewing angle that includes the area immediately adjacent to the respective side of the vehicle. Such a pair of rear-positioned forward-looking cameras may be used in combination with forward-mounted rearward-looking cameras, for example, one forward-mounted rearward-looking camera positioned on the right side of the vehicle near the front side, that is, at the corner of the vehicle where the right side meets the front, and a corresponding forward-mounted rearward-looking camera positioned near the front on the left side of the vehicle.

In such a system, the several monitors may also include a second monitor operable to provide driver selection between displaying only the second field of view and only the fourth field of view; and a third monitor operable to provide driver selection between displaying only the third field of view and only the fifth field of view. For example, the second monitor may be positioned to the right hand side with respect to the driver's area of the first monitor, and the third monitor may be positioned to the left hand side with respect to the driver's area of the first monitor.

According to an aspect of the present system, the first monitor may automatically switch between displaying only the first field of view and only the sixth field of view based on a driver operation of a control for moving the vehicle.

By way of illustration, the first field of view may include an area immediately adjacent the vehicle, including a driver blind spot. The second field of view and the fourth field of view may also each include an area immediately adjacent the vehicle.

As shown for example in FIG. 1, the right rear view camera may be positioned at the right side of the vehicle anterior to the driver's area, the left rear view camera may be positioned at the left side of the vehicle anterior to the driver's area, the right side camera may be positioned at the right side of the vehicle posterior to the driver's area, and the left side camera may be positioned at the left side of the vehicle posterior to the driver's area. Each camera may be fixedly attached with respect to the vehicle in a stationary position and provides an unadjustable field of vision.

Also, a cabin rear view camera may be included such that it is positioned inside the vehicle to include a seventh field of view including an area inside the vehicle anterior to the driver's area, and a fourth monitor could then display the seventh field of view. Each monitor may be positioned above a dashboard of the vehicle.

Such a system could provide all fields of view as required by U.S. regulation for school buses without use of any mirrors positioned on an exterior of the vehicle, according to U.S. regulation FMVSS 111 for school buses.

Other features and advantages of the present disclosure will become apparent from the following description of the disclosure that refers to the accompanying drawings.

DETAILED DESCRIPTION OF EMBODIMENTS OF THE INVENTION

With reference to the above-described Drawings, various embodiments of the invention are described below.

Figure 1:
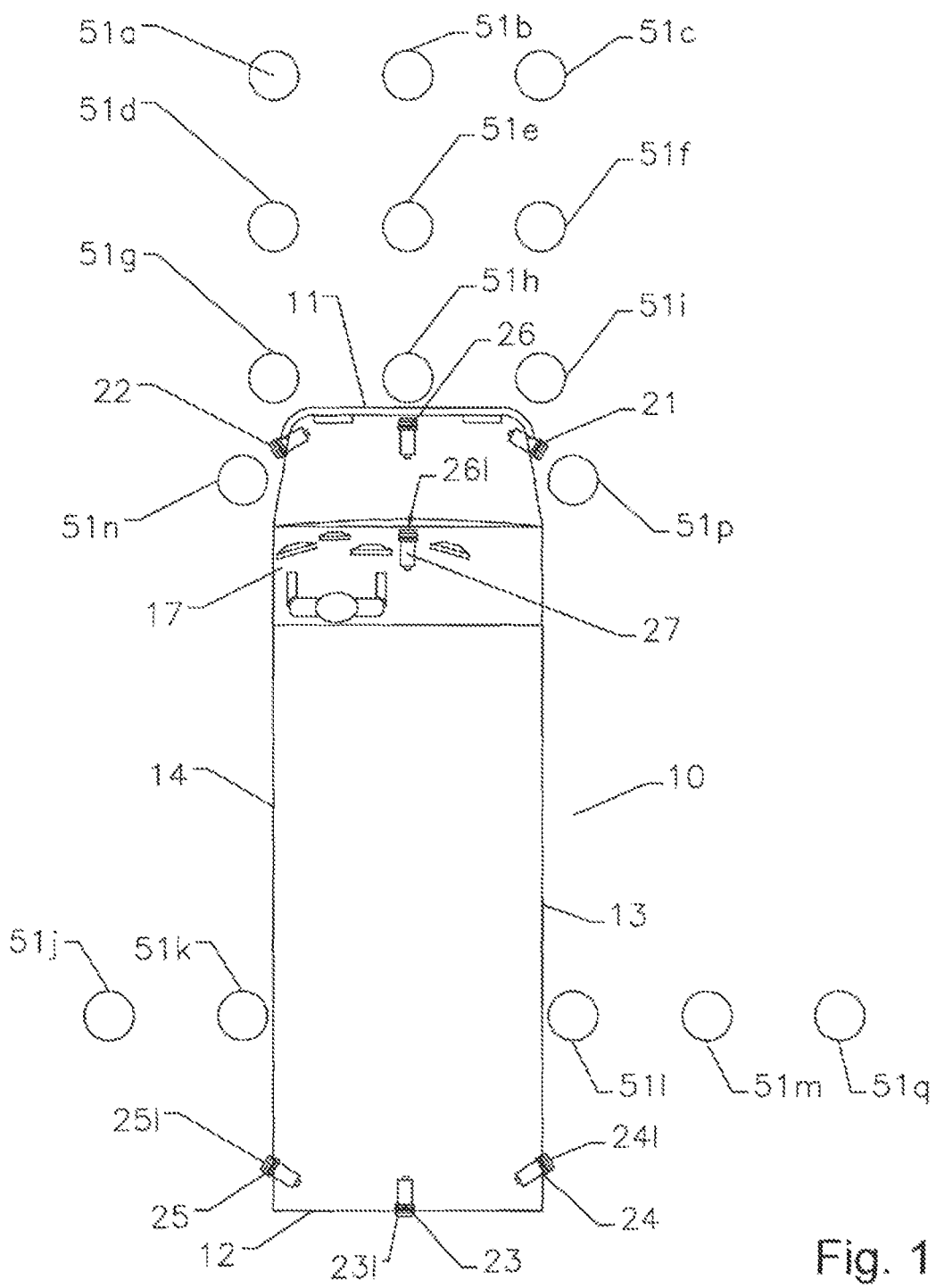
FIG. 1 is a top view schematic illustration of a vehicle with the cameras and the monitors according to an aspect of the present invention.

FIG. 1 shows a vehicle 10 in relation to cylindrical drums 51a-n and 51p-51q which Federal regulations require to be visible by the driver from the driver's cabin 17. The first nine cylindrical drums 51a-51i are positioned in three rows and three columns immediately in front of the vehicle. Accordingly, cylindrical drum 51h is positioned immediately in front of the vehicle and will typically be in the driver's blind spot in front of the hood. Conventionally, a cross-view mirror (not shown) would be positioned on the right side of the vehicle protruding away from a wall of the vehicle near the front, and would provide the driver with a view of cylindrical drum 51h. Drums 51n and 51p are positioned adjacent the left and right side, respectively, of the front of the vehicle, anterior to the driver's cabin 17. Drums 51j and 51k are positioned to the left of the vehicle more than half-way toward the back of the vehicle, and cylindrical drums 51l, 51m and 51q are positioned to the right of the vehicle, forming the same row as cylindrical drums 51j and 51k. As discussed, cylindrical drum 51q is typically taller than the other cylindrical drums 51a-n and 51p.

The vehicle 10 is sometimes described herein as a schoolbus in keeping with the above-discussed Federal Regulations. However the present invention will be useful to any truck or vehicle, including a passenger vehicle such as a bus, van, minivan, SUV, RV, or automobile.

The cameras according to an aspect of the present invention will now be described with reference to FIGS. 1-3. FIG. 1 illustrates right rear-view camera 21 positioned on the exterior of the vehicle 10 at a position similar to that of a conventional cross-view mirror. Right rear-view camera 21 is positioned on the right side (starboard) 13 of the vehicle 10 and is shown as being anterior to the driver's cabin 17. Right rear-view camera 21 is positioned so that it is oriented toward the side and back of the vehicle and may have a field of view that corresponds to field of view 43a shown in FIG. 2. Like the other cameras described herein, right-rear view camera 21 may be mounted by camera arms to the exterior of the vehicle. Thus, right rear-view camera 21 and the other cameras described may be mounted on the arm assemblies which are typically provided for cross-view mirrors and which are oftentimes located at a position forward and to the side of the actual silhouette or outline of the vehicle.

In accordance with a further concept of the present disclosure, right rear-view camera 21 and the various cameras may be mounted on an arm assembly, whereby if the mirror hits any obstacle it swings sideways (backwards with respect to the motion of the vehicle 10) to protect it from becoming damaged, and may automatically rebound or swing back to its original position, as described in the instant assignee's U.S. Pat. No. 6,883,923, the full contents of which are incorporated by reference herein. While the bus shows the cameras 21 and 22 located on the engine hood, these cameras can also be mounted on snubbed hood buses so that the cameras 21 and 22 would be located very close to the bus windshield, high on the bus and looking generally down and rearwardly. The minors 21 and 22 can also be located on arm assemblies of the type that are typically provided for cross-view mirrors of the type disclosed in the present assignee's U.S. Pat. Nos. 7,055, 973; 6,883,923; 6,796,667; 5,576,899; and 6,371,618, the contents of all of which patents are incorporated by reference herein.

Further, each of the cameras may be surrounded to the extent possible by a protective tubular structure which is anchored to the arm assembly, to allow the protective structure to absorb any blow or sudden force resulting from hitting an obstruction, thereby protecting the camera from damage.

Alternatively, the right rear-view camera 21 and the other cameras described herein may be formed integrally with the exterior wall of the vehicle or may be disposed well above the front hood of the vehicle 10 or above the roof of the driver's cabin 17. Like the other cameras described herein, right rear-view camera 21 may be any type of camera that provides an instant signal showing the object in its field of view to a monitor located in the driver's cabin 17. For example, right rear-view camera 21 may be a digital camera that, in real time, provides a digital signal to one or more monitors in the driver's cabin 17.

Right rear-view camera 21 provides a field of view 43a (shown in FIG. 2 with lines sloping up) that includes the area immediately to the right of the vehicle 10.

Left rear-view camera 22 shown in FIG. 1 may be identical or different in structure from right rear-view camera 21, and is positioned on the left side (port) 14 of the vehicle 10. FIG. 1 shows left rear-view camera 22 as being positioned anterior to the driver's cabin 17. Left rear-view camera 22 provides a field of view 44a (shown in FIG. 2 with lines sloping up) that includes the area immediately to the left of the vehicle 10. Left rear-view camera 22 may be identical or different from right rear-view camera 21 in the way it is mounted to or integrally formed with the wall of the vehicle 10. Similarly, each of the other external cameras 23-26 may be identical to or different from right rear-view camera 21 in structure and in the way they are mounted to or formed integrally with the external wall of the vehicle 10.

Backup-view camera 23 is positioned at a rear wall 12 of the vehicle 10 and is oriented to provide a field of view 42 (shown in FIG. 2 with lines sloping down) immediately posterior to the vehicle 10.

Figure 3:
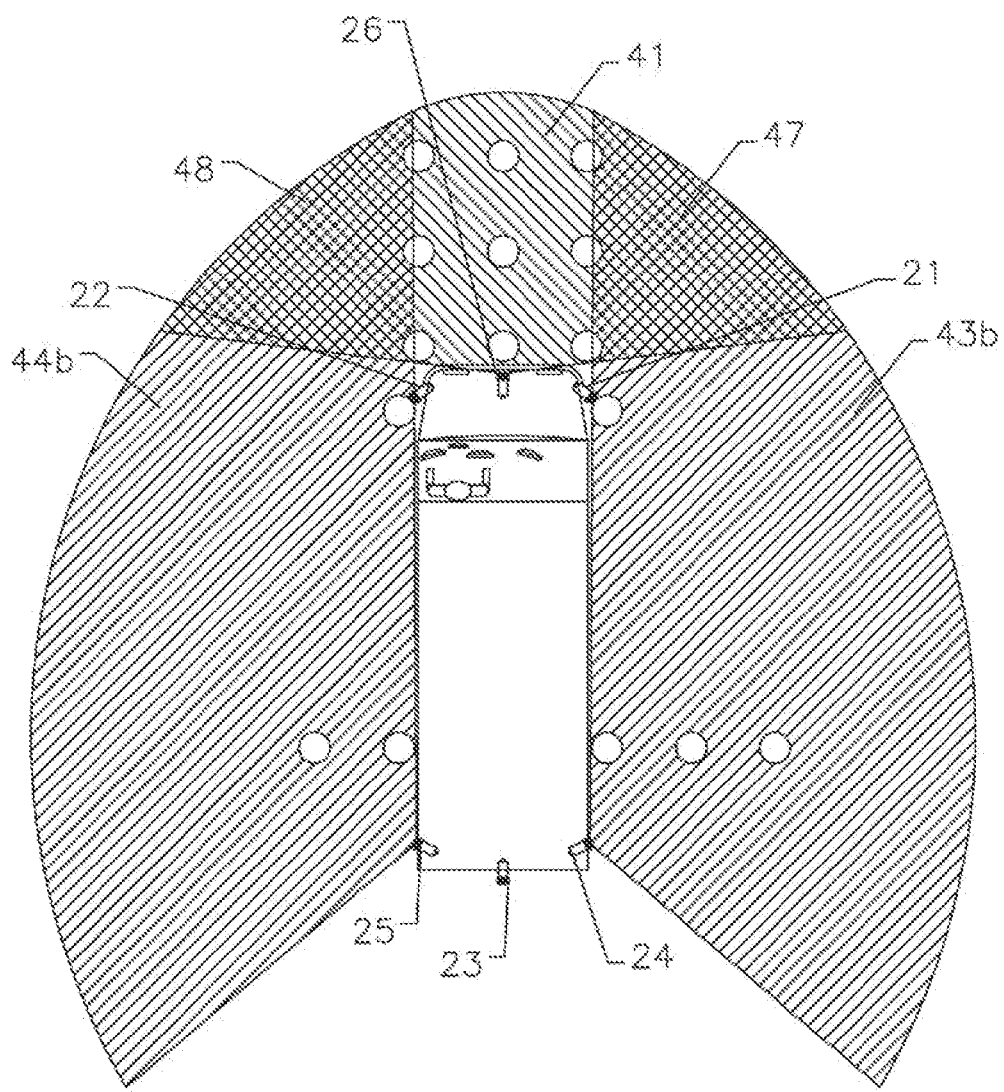
FIG. 3 is a top view schematic illustration of the vehicle with the cameras and monitors according to an aspect of the present invention with additional fields of view of several of the cameras.
Figure 3:
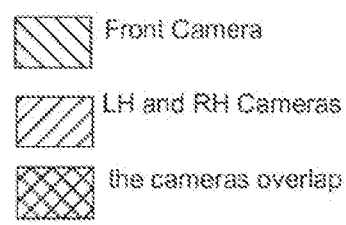

Right forward-view camera 24 may be positioned just forward of the rear of the vehicle on the right side 13 of the vehicle 10 and may be oriented to provide a field of view 43b (shown in FIG. 3 with lines sloping up). On the left side of the vehicle, possibly aligned approximately at the same distance from the rear 12 of the vehicle as the right forward-view camera 24, is left forward-view camera 25. Left forward-view camera 25 may be positioned to provide a field of view 44b (shown in FIG. 3 with lines sloping up).

Positioned on the front 11 of the vehicle 10 may be forward-view camera 26. Alternatively, forward-view camera 26 may be positioned on a roof of the vehicle 10 or just below the roof behind the windshield inside the driver's cabin 17 or external to the vehicle 10, high on the windshield or just above the roof of the driver's cabin 17 near the center of the vehicle 10. Forward-view camera 26 may provide a field of view 41 shown in FIG. 3 with lines sloping down. Forward-view camera 26 may be positioned slightly downward to provide a field of view 41 that includes any passersby, including children, or other small objects immediately in front of the vehicle 10.

Figure 2:
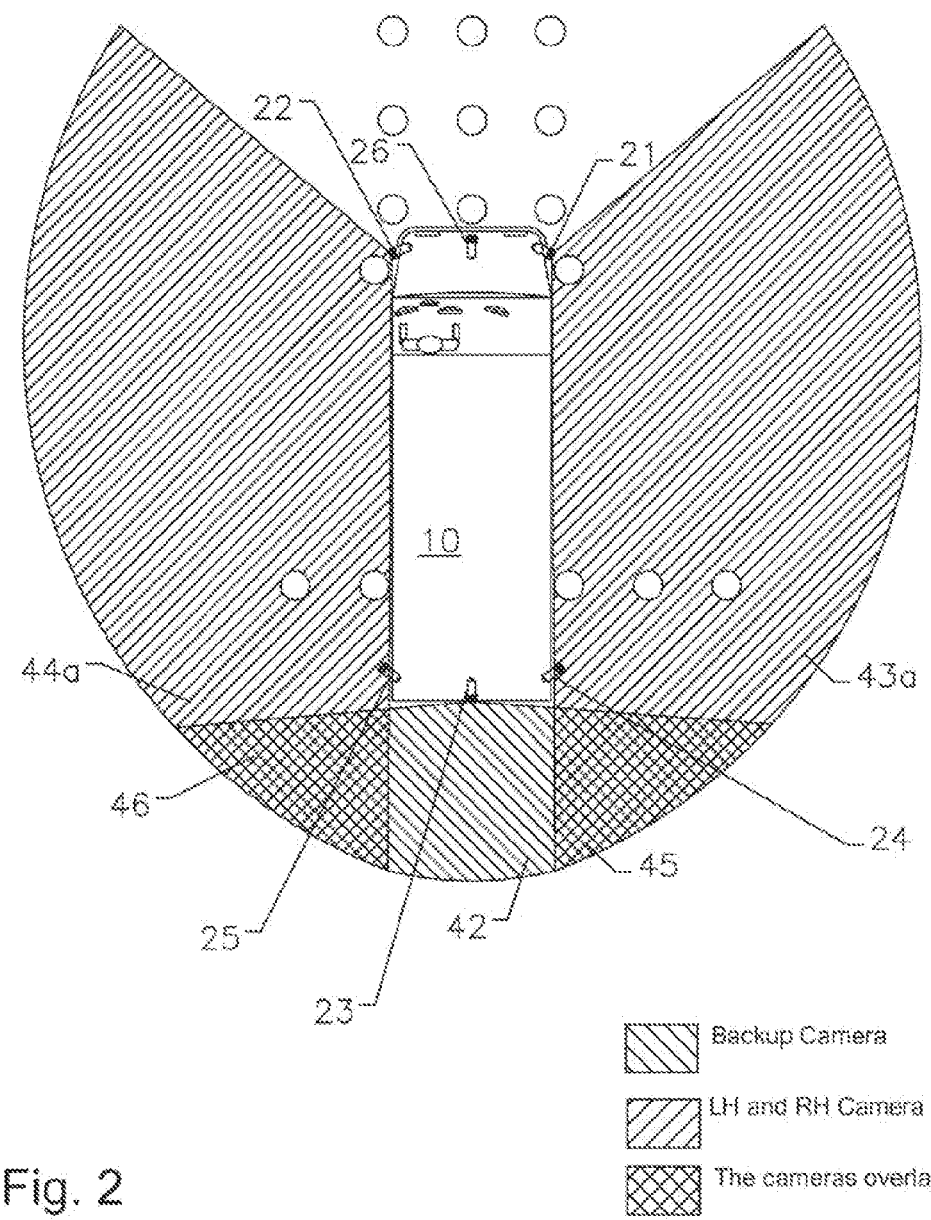
FIG. 2 is a top view schematic illustration of the vehicle with the cameras and monitors according to an aspect of the present invention, and shows fields of view of several of the cameras.

As shown in FIG. 2, according to an aspect of the present invention, to provide a margin of error, the fields of view may be overlapped. As shown in FIG. 2, cross-hatched area 46 illustrates the overlap between the field of view 42 provided by the backup-view camera 23 and the field of view 44a provided by the left rear-view camera 22. Similarly, cross-hatched area 45 shows the overlap between the field of view 42 provided by the backup-view camera 23 and the field of view 43a provided by the right rear-view camera 21.

FIG. 3, similarly, shows cross-hatched area 47 illustrating the overlap between the field of view 43b provided by the right forward-view camera 24 and the field of view 41 provided by the forward-view camera 26. The cross-hatched area 48 shows the overlap between the field of view 44b provided by the left forward-view camera 25 and the field of view 41 provided by the forward-view camera 26. It will be understood that the fields of view 41-48 are provided for purposes of illustration of fields of view of the respective cameras but are not intended to be comprehensive views of possible fields of view. Many other configurations of fields of view are possible without departing from the spirit of the present invention.

Each camera may provide a panoramic lens that provides a 120-degree view before it. Or, each camera may provide a 90-degree view or a smaller angle view of the area in front of it and thus provide a reduced distortion in its field of view. Also, it will be understood that two or more cameras may be mounted in place of each of the cameras described, such that each of the cameras are positioned at slightly different angles to increase the field of view of the combined cameras. The image displayed on the monitor at the driver's station may then be digitally combined in a seamless fashion to provide a single image for the driver. Thus, what is contemplated, according to an embodiment of the present invention, is a mosaic image that is stitched together for each camera position and provided to the display.

Also contemplated is an infrared (IR) illumination system to provide for night vision. One or more infrared illumination devices may be provided below or on top of each camera, or a pair of such devices may be provided on either side of each camera, to illuminate the field of view around the vehicle during poor visibility conditions, such as at night, or during early morning hours. Thus, the system according to the present invention may be made suitable for 24-hour use. The IR illumination system may be provided as an LED lighting strip, an incandescent light source or as some other type of illumination.

Figure 6:
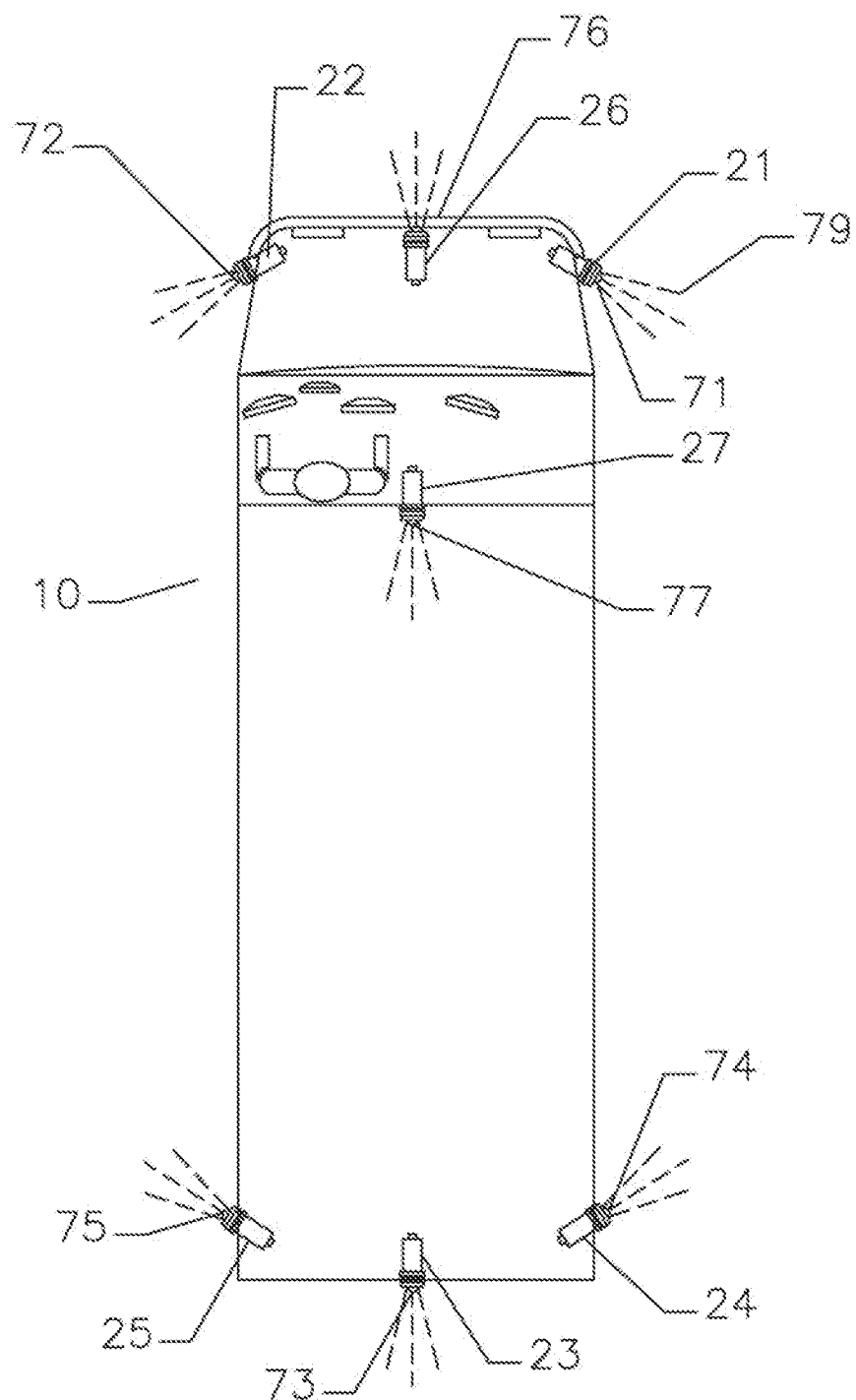
FIG. 6 is a top view schematic illustration of the vehicle with the cameras and electromagnetic spectrum irradiation devices positioned adjacent each camera according to an aspect of the present invention.

FIG. 6 shows electromagnetic spectrum irradiation device 71 protruding from underneath camera 21 on the right side near the front of the vehicle 10. The electromagnetic spectrum irradiation device 71 may project IR frequency or radio frequency or other irradiation which is then reflected off nearby objects, or passersby, and the reflected radiation is picked up by camera 21 to provide night vision or vision outside of the visual spectrum. As discussed, however, the electromagnetic spectrum irradiation device 71 may also be provided as a visible range light source, such as an incandescent bulb or floodlight, or an LED or halogen lamp to provide illumination for the camera 21. The electromagnetic spectrum irradiation device 71 could be disposed so that the radiation 79 is pointed downward; thus the camera 21 is not flooded with direct light or radiation to mitigate the problem of glare. Also, a small light shield or visor may be provided between the electromagnetic spectrum irradiation device 71 and the camera 21. Although shown as being provided beneath the camera 21, the electromagnetic spectrum irradiation device 71 may be positioned on top of the camera or on a side thereof. FIG. 6 also shows similar irradiation devices 72-77 positioned near or below each of cameras 22-27.

Figure 7:
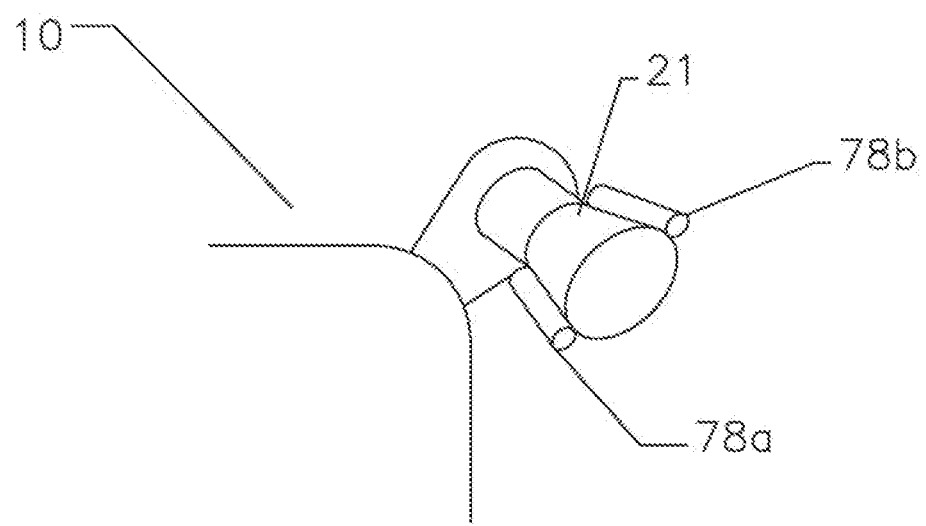
FIG. 7 is a perspective schematic illustration of a camera with two adjacent ancillary devices according to an aspect of the present invention.

FIG. 7 is a close-up view of camera 21 positioned at a corner of the vehicle 10 with two ancillary devices 78a and 78b instead of electromagnetic spectrum irradiation device 71. Ancillary devices 78a and 78b may each provide electromagnetic spectrum radiation. Such an arrangement may increase the field compared with single electromagnetic spectrum irradiation device 71 for the camera 21.

Alternatively, one of the ancillary devices 78a and 78b may be a conventional light source in the visible spectrum while the other may be an IR light source. Also, one of the ancillary devices 78a and 78b may provide illumination in the visible or other spectra for the camera while the other may be provided as a LADAR (Laser Radar) so as to recognize and track nearby stationary or moving objects or passersby. Also available for commercial use is infrared laser technology for object detection and tracking, which uses IR rays instead of visible light. As a further alternative, ancillary device 78a may be provided as not an irradiation unit but as a detection unit for receiving IR, laser, radio, or other frequency radiation so as to provide a display for the driver, in addition to or instead of the visible range light detected by camera 21. In this configuration, the ancillary device 78b may still be an electromagnetic spectrum irradiation unit as described above. Such ancillary devices 78a and 78b may be provided for each of the cameras 21-27. Also, it will be appreciated that while shown as being provide beneath the camera 21, ancillary devices 78a and 78b may be positioned in other areas adjacent or near the camera 21. Further, while two ancillary devices 78a and 78b are shown, a greater number may be provided, so that, for example, one serves as an illumination device in the visible spectrum for the camera 21, one is provided to illuminate in spectra other than the visible, one is provided as a LADAR for detecting and tracking moving objects, and one is provided to detect IR or other waves for generating an image for the driver based on non-visible radiation. In addition, a single unit may provide two or more of such functions.

Figure 8:
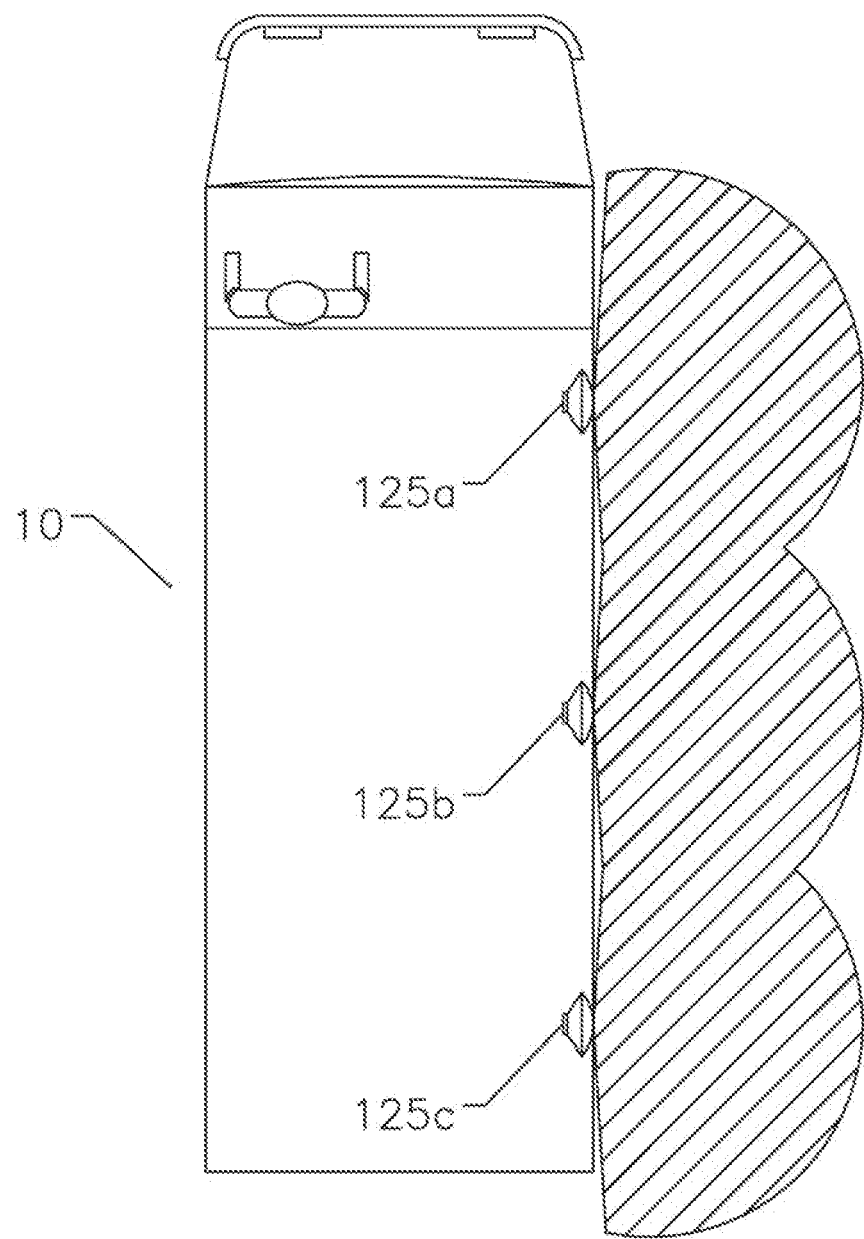
FIG. 8 is a top view schematic illustration of the vehicle with floodlights mounted at the roof thereof.
Figure 9:
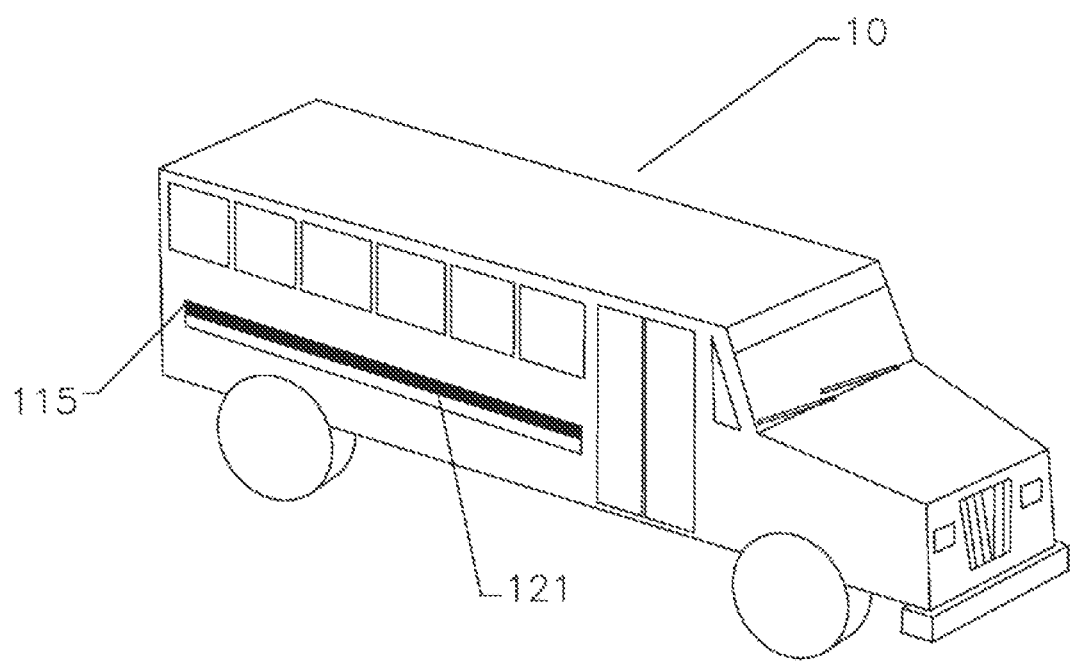
FIG. 9 is a schematic illustration of the vehicle with lighting strips mounted on sides thereof.

Also, as shown in FIG. 9, the side lighting strip 121 extending along all or most or some of a side of the vehicle 10, or on both sides thereof, disclosed in U.S. Provisional Application No. 60/913,580, entitled "External Safety Illumination for a Bus," may include a strip of LED, incandescent, or other visible light sources, or an infrared illumination source, or a set of such sources along the lighting strip 121, so that when used in combination with the system according to the present invention, visible or infrared illumination will reach each of the cameras 21-27. Lighting strip 121 may be positioned beneath a bumper or visor 115 to protect and shield the lighting strip 121. The bumper or visor 115 may extend along the side of the vehicle 10 along the entire upper edge of the lighting strip 121, as shown in FIG. 9, and may work to reduce glare or direct light to the cameras. Similarly, in addition to or instead of deploying infrared illumination in the lighting strips 121 (shown in FIG. 9) the floodlights 125a-125c positioned on the roof of the vehicle (shown in FIG. 8) disclosed in the same U.S. Provisional Application No. 60/913,580, or at other parts of the vehicle, may also be provided to provide visible light or infrared illumination.

Also, an infrared illumination source may be provided underneath, on top of, or on either one or both sides of interior cabin camera 27 to provide the driver with a view inside of the vehicle 10 at night or when the interior lights (not shown) of the vehicle 10 are dimmed. This could be useful in a schoolbus application to monitor the activity of children on board.

Also, an automatic target recognition (ATR) may be provided with one or more of the cameras. FLIR (Forward-Looking Infrared) systems, LADAR and infrared laser sensors are well known for sensing and tracking people or stationary or moving objects. Such ATR systems may be programmed to be particularly sensitive to detect and track images of people or children or other passersby in close proximity to the vehicle 10, for example.

Thus, such ATR systems, when used in combination with a system according to the present invention may be particularly useful to avoid accidents involving passersby moving around the vehicle. Such an ATR system may be deployed next to, for example above or below, each camera and may be programmed to provide an audio input, or a flashing light or the like when an object is detected. Also, the ATR may track the moving object and a silhouette or outline of the moving figure may be highlighted on the monitor provided in the driver's area. Since a system according to the present invention may provide a 360-degree view around the vehicle, there would ordinarily be no need to move or pan the camera to track the moving object, such as the passerby. However, the camera could be moved automatically, or under the control of the driver, to follow the detected and tracked moving object near the vehicle 10.

The camera control may optionally also include image processing which detects children moving about the school bus and which displays the moving children in a sharp color, for example, red, against a background of black, white or grey to allow the driver to keep a sharp eye and not lose sight of children milling about the school bus while children either disembark or alight the school bus.

Also contemplated is a physical sun visor and sun shield provided over each of the cameras to block a significant portion of sun incident on the camera lens. Also, each camera lens may be covered with a light filter to screen out light or other harsh or bright radiation.

In addition, electronic controls may be provided to filter out excessive sunshine or bright lights. According to an aspect of Applicant's invention, for example, the electronic controls may reduce input to the CCD array when excessive radiation is detected to prevent the reaching of a saturation level, which could provide prolonged white streaks on the image. For example, input to the CCD array may be diminished at a rate that is directly proportional to the rate at which the excessive radiation is increasing, and thus the reaching of a saturation level for the CCD array may be controlled or eliminated.

The cameras may be provided such that they are substantially inside the vehicle to prevent theft or vandalism. Also, the cameras may be provided as breakaway cameras such that if they undergo excessive impact the vehicle will not be damaged because the camera and/or the camera mount breaks off because of the impact. For example, according to an embodiment of the present invention, the base on which the camera is mounted may swing and rebound as the result of an impact with an object. The cameras on the side may swing back and forth with respect to the movement of the vehicle and they may be provided with a gooseneck mount to facilitate the swinging and rebounding. The assignee of the present invention has described swinging and rebounding mirror mounts and breakaway and snap back mirror supports which can be utilized directly for mounting the cameras of the present invention. Such descriptions appear, among other places, in the present assignee's U.S. Pat. Nos. 6,398,376; 6,796,667; and 6,883,923, the contents of which patents are incorporated by reference herein. Similarly, the cameras mounted on the front and back of the vehicle may swing and rebound from left to right (or right to left) with respect to the moving direction of the vehicle. Also, the cameras may be encased in a heavy duty protective case, such as a plastic case or a PVC case or a metallic case that absorbs impact or shock to the cameras from moving objects or vandals.

Each of the right forward-view camera 24 and the left forward-view camera 25 may be positioned on the top of the roof of the vehicle 10, inside the vehicle 10, or alternatively, may be provided partially inside the vehicle with the lens portion 241 of right forward-view camera 24 and the lens portion 251 of left forward-view camera 25 positioned just outside of the vehicle 10. Similarly, the backup-view camera 23 may be positioned on the roof of the vehicle, or just underneath the roof of the vehicle inside the cabin, or alternatively, may be positioned mostly inside the cabin with the lens portion 231 protruding outside of the vehicle. By positioning the lens portion outside of the vehicle, it will be ensured that no glare is generated by the window of the vehicle 10. On the other hand, providing the camera entirely inside the vehicle will tend to keep the lens freer of precipitation, dust and urban smog, and will tend to keep the camera safer from theft, vandalism or the like. Similarly, the forward-view camera 26 may be positioned partially inside the vehicle with the lens portion 261 protruding outside of the vehicle 10 or outside of the windshield or outside of the grill of the hood or the like.

In addition, right forward-view camera 24 and left forward-view camera 25 may be positioned underneath the body of the vehicle 10 since their primary aim may be to view small objects or passersby located near the vehicle (as shown in FIG. 1 with respect to the cylindrical drums 51j-51n and 51q). Similarly, backup-view camera 23 may be positioned on the underside of the vehicle 10.

Figure 4:
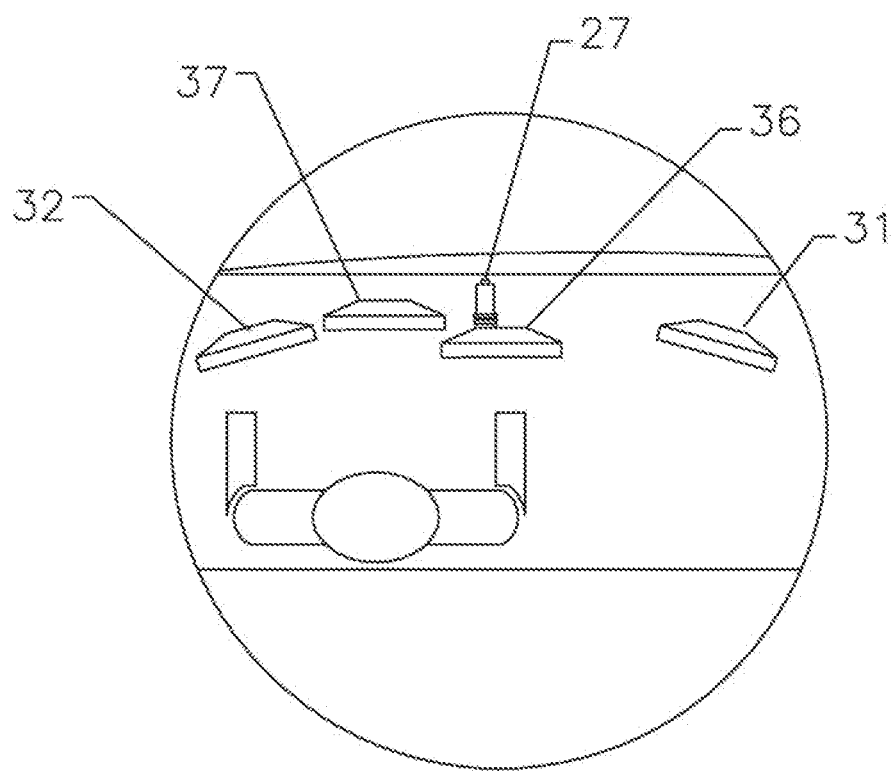
FIG. 4 is a top view schematic illustration of a driver's cabin of the vehicle showing monitors of the system of the present invention and a camera.
Figure 5:
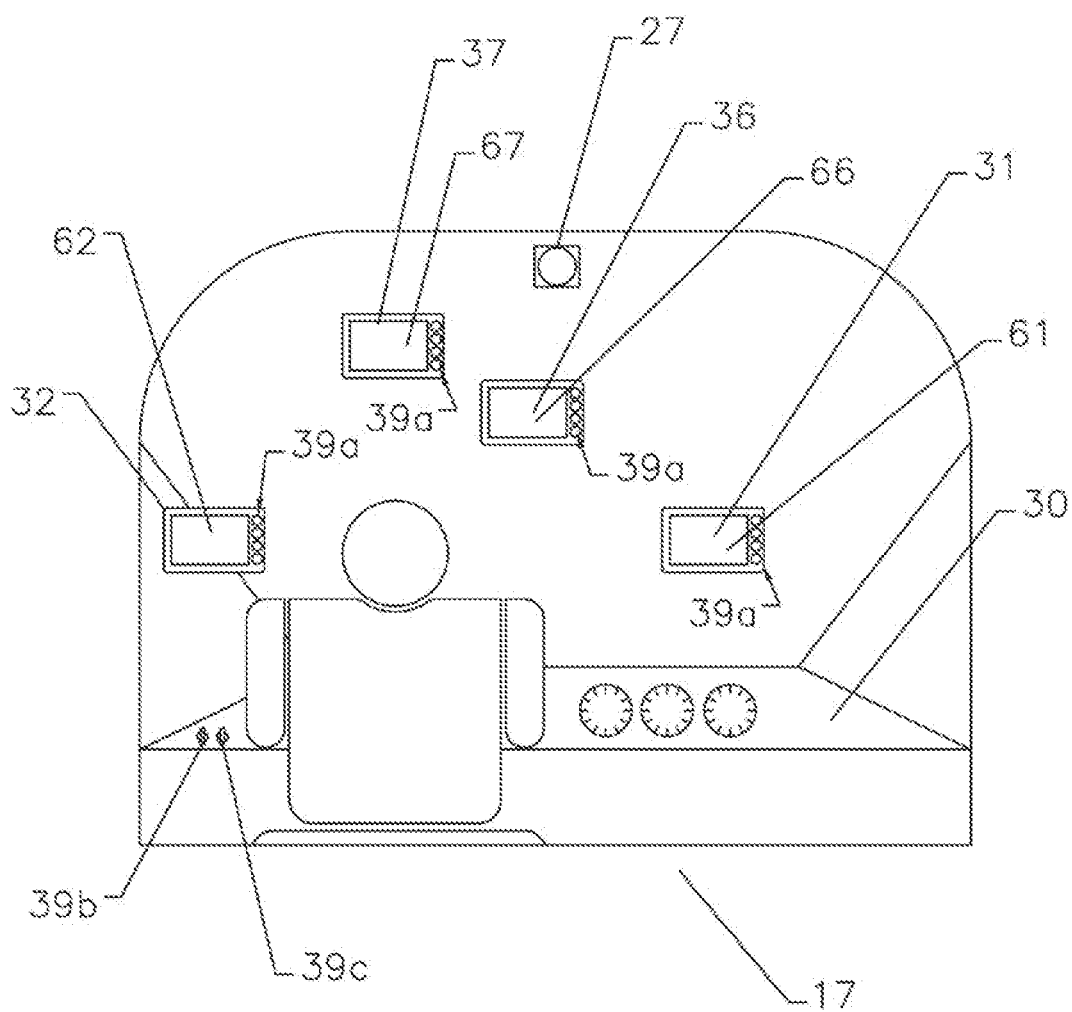
FIG. 5 is a back view schematic illustration of the driver's cabin showing the back of the driver, the dashboard and the monitors and a camera according to an aspect of the present invention.

The position of the monitors with respect to the driver's cabin 17 will now be described with reference to FIGS. 4 and 5. FIG. 5 shows the dashboard 30 and monitors 31, 32, 36 and 37 positioned at various positions above the dashboard. However, it will be understood that monitors 31, 32, 36 and 37 may be positioned in the same line or on the dashboard or at various other parts of the driver's area within view of the driver. Also, while four monitors are shown, more or fewer monitors may be provided.

Monitor 36 provides the driver the option of selecting as the display 66 to be displayed on the monitor 36 the field of view 41 (shown in FIG. 3) provided by the forward-view camera 26 and the field of view 42 (shown in FIG. 2) provided by the backup-view camera 23. The field of view 41 provided by the forward-view camera 26 may be understood as including or encompassing the cross-view, which includes the blind spot immediately in front of the hood of the vehicle. Thus, the driver may switch between the field of view of forward-view camera 26 and backup-view camera 23 by operating control 39a provided as part of the monitor 36. Alternatively, a central control 39b may be provided on the dashboard 30 to allow the driver to select between displaying on each of the monitors the field of view provided by the forward cameras 21, 22 and 26 and the back cameras 23-25.

Monitor 31 provides a display 61 which shows one of the following: the field of view 43a provided by right rear-view camera 21, or the field of view 43b provided by right forward-view camera 24. Similarly, monitor 32 provides a display 62 which comprises one of the field of view 44a provided by left rear-view camera 22 or the field of view 44b provided by left forward-view camera 25. Thus, according to an aspect of Applicant's invention, as shown in FIG. 5, an intuitive set of views is provided to the driver with the central forward view and backup view provided by the central monitor 36, the right side view of the vehicle 10 provided by the cameras on the right side of the vehicle shown on the right monitor 31 and the left side view of the vehicle observed by cameras on the left side of the vehicle shown on the left monitor 32.

Also, a convenient and simple switching mechanism is provided to the driver, allowing the driver to switch between the forward cameras and the rearward cameras. As discussed, by using the single control 39b, the driver is able to switch all of the displays of the monitors 31, 32 and 36 from showing fields of view of the forward cameras 21, 22 and 26 to the back cameras 23-25. In addition, monitors 31, 32 and 36 may be programmed to provide a split display showing simultaneously each of the two views provided by the two cameras for each monitor.

According to a further embodiment, the view displayed in the monitor 36 may be automatically switched according to the operation of the vehicle 10. For example, when the vehicle gear is shifted to "reverse" gear, the display 66 of monitor 36 may show the field of view 42. Similarly, monitors 31 and 32 may also display the fields of view 43a and 44a of the right rear view camera 21 and the left rear view camera 22, respectively.

Figure 10:
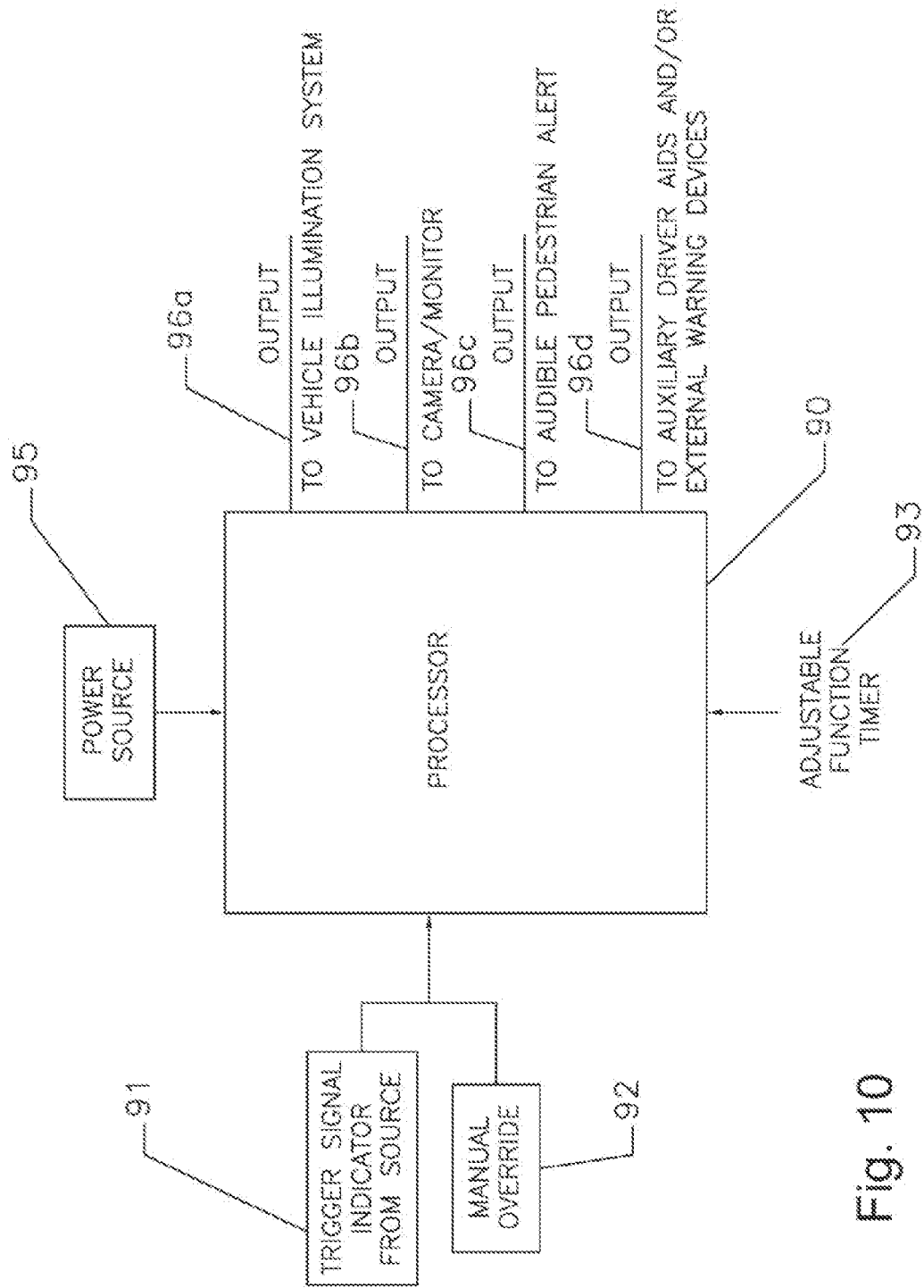
FIG. 10 is a schematic illustration of a control system for the camera and monitor system according to an aspect of the present invention.

FIG. 10 is a schematic illustration of a control system for the camera and monitor system according to an aspect of the present invention. Processor 90 receives input from trigger signal indicator 91, such as, for example, the shifting of the vehicle 10 from a park gear to a first gear, the opening or closing of a vehicle door, the turning on or off of an amber or red flashing schoolbus light to indicate boarding/disembarking, or the like. Processor 90 also receives input from manual override 92, which allows a driver to control the cameras, monitors, external lighting, audible alerts and external warning devices or the like, for example, by controlling operating control 39a or central control 39b, by opening a vehicle door, or the like. A power source 95 provides power to processor 90. Also, adjustable function timer 93, for example a processor clock, can be adjusted to provide timing signals for the processor 90 for controlling functions that require timing.

Processor 90 may provide integrated control over the camera, monitor, lighting, audible alert, and other external warning systems of the vehicle. Accordingly, processor 90 controls the ON/OFF state and operation of the vehicle illumination system, including lighting strips and floodlights, through output 96a, the ON/OFF state and operation of the camera and monitor systems through output 96b, the ON/OFF state and operation of the audible pedestrian alert system, such as the audio alert system for passersby and passengers boarding or disembarking from the vehicle 10 through output 96c, and the ON/OFF state and operation of auxiliary driver aids or other external devices, for example, the flashing amber or red schoolbus light, the crossing gate or stop sign mounted from the exterior of the vehicle, or the like, through output 96d. Thus, as discussed, when the schoolbus door is opened, processor 90 receives a trigger signal from trigger signal indicator 91, and the processor 90 may then activate a passenger boarding mode, which could entail turning on the red or amber flashing schoolbus lights, the turning on of lighting strip 121, the switching of the monitor 36 to display of the signal from forward looking camera 26, the deployment out of the crossing gate mounted on the driver's side of the exterior or the vehicle, the turning on of an audible sound to inform children that it is safe to approach the schoolbus or to cross the street, and the like. Similarly, the receipt of a signal indicating the closing of the door of the vehicle 10 may cause the processor 90 to output a different set of instructions via outputs 96a-96d.

Although shown for illustration as separate individual outputs, outputs 96a-96d may be provided as a single signal bus, or may be provided as an output interface that communicates via a wired or wireless connection with the systems that control the above-discussed systems controlled by processor 90. Also, these controlled systems may provide feedback signals or messages to processor 90, to indicate a receipt/non-receipt of a signal, message or command, a failure or malfunction of the controlled system, a light sensor reading or other external condition, or the like.

For example, initially when the vehicle is shifted to the "drive" gear, the outputs of the rearward looking cameras 21 and 22 may be immediately shown on the monitors 31 and 32. Initially, and for a period of about 7 to 15 seconds, or thereabout, the output of the forward looking camera 26 continues to be displayed on the monitor 36, and thereafter, the output of the camera 23 begins to be displayed, so that as the driver embarks on a trip to a given destination, the displays show the view to the side and to the back of the bus to improve the driver's ability to monitor traffic gaining on the vehicle 10 or in adjacent lanes. In fact, a controllable programmer may be provided to allow the driver to select when the different camera outputs are shown on the monitors, in response to the switching of the transmission from "drive" to "reverse" and vice versa. In accordance with another embodiment of the disclosure, the output of the camera selected for being displayed is determined on the basis of the forward speed of the vehicle 10. For example, the output of the camera 26 may be switched away from the monitor 26 while the vehicle is in the drive mode, but only after the vehicle 10 has reached a given speed, for example, 10 miles an hour.

Also, the display on each monitor may be controlled based on the speed of the vehicle 10. For example, after the vehicle is switched into driving gear, or first gear, from park or reverse the output of the forwardly-mounted rearward-looking cameras 21 and 22 may be shown in the monitors 31 and 32, respectively. When the vehicle 10 is shifted into parking gear, or to first gear from a higher gear, the display in the monitors 31 and 32 may be switched to the output of the rear-positioned forward-looking cameras 24 and 25. These switching modes are provided as examples, and the sequence of displays provided may be programmed according to the convenience of the driver, or according to the wishes of the schoolbus operator company.

Also contemplated is a night view mode for the monitors. In night view mode the brightness of the monitors would be automatically or subject to driver control dimmed so as to prevent driver eye strain. The monitors could be dimmed gradually based on an automatic detection of the level of darkness.

In accordance with yet a further embodiment of the disclosure, an image processing system may receive the output of the various cameras and be provided with a signal processing system that is able to monitor targets which are non-stationary, i.e., moving objects. Thereby, the system might be utilized for zooming in or adjusting the precise aim of the camera while the school bus is stationary, to ensure that a child or several children moving in front or alongside the bus can be monitored by providing image sizes of these moving children or other passersby to the bus driver in a size that will effectively make their presence known to the driver.

In addition, the signal processing system may provide an audible indication to driver, for example, a buzzing sound as long as the system detects objects that are moving near and about the vehicle 10 while the vehicle 10 is parked for the purpose of taking on or discharging passengers.

It is within the purview of the present disclosure that the system also includes a digital video recorder (DVR) which is fed the signals from all, or fewer than all, of the cameras and these DVRs serve the function of recording the images provided as soon as a sensor (not shown) detects that the bus is in motion, and/or while there is any activity in and around the vehicle 10 to trigger the recording of the images. This can occur in response to detection of any passerby approaching the bus, or in response to an actuation of the camera system by a dashboard pushbutton in another situation, for example, when the vehicle 10 is left unattended, so as to prevent vandalism and theft.

The monitors 31, 32, 36 and 37 may be any type of monitors suitable for displaying an image in real time, such as CRT displays, LCDs, LEDs, front or rear projection devices, flat panel devices, or the like.

Also shown in FIG. 5 is interior cabin camera 27, which provides the driver with a view of the inside of the vehicle. As shown in FIG. 4, interior cabin camera 27 may be positioned just above the windshield in the driver's cabin 17 or may be positioned posterior to the driver's cabin 17 inside the vehicle. Particularly for a schoolbus or other large vehicle application, camera 27 affords the driver a view of what is happening inside the vehicle behind the driver in real time. Images detected by camera 27, shown in FIGS. 4 and 5, may be displayed on monitor 37, which shows display 67, the interior cabin view or the view inside the vehicle 10 behind the driver's cabin 17.

According to an aspect of Applicant's invention, cameras 21-26 are fixedly attached to the vehicle so that they provide a fixed field of view in their respective positions. According to such an embodiment, the driver is always afforded a view that includes each of the vital areas contemplated by regulation to ensure the safety of passengers boarding or disembarking from the vehicle 10 or surrounding the vehicle 10. For example, children disembarking from the vehicle may fall under the vehicle and therefore it may be important to ensure an unchanging field of view by each of the cameras.

According to another embodiment of the present invention, cameras 21-26 maybe secured to the vehicle 10 such that the driver is able to control the fields of view of the cameras 21-26 by moving them from left to right or up and down as necessary to view surrounding people or objects. Similarly, the cameras 21-26 may be configured to allow zooming or backing up (unzooming) of each of the cameras to allow the driver a close-up view or a greater depth of field as needed. Such control of the cameras maybe afforded by controls 39a of the monitors shown in FIG. 5. According to such an embodiment, a reset button 39c may be provided to allow the driver to reset each of the cameras to a default position to reinstate the fields of view previously set for the vehicle. In this way, the vital points around the vehicle could be captured again as part of the standard or default fields of view of the cameras by pressing reset button 39c.

While shown as being provided just interior to the rear 12 of the vehicle 10, the right forward-view camera 24 and the left forward-view camera 25 may be positioned at or near the rear side 12 of the vehicle 10, or they may be positioned anterior to the positions shown in FIG. 1. For example, right forward-view camera 24 and left forward-view camera 25 may be positioned farther from the rear 12 at, or closer to, the center of the vehicle 10. In such an embodiment the angle of these cameras would typically be adjusted out (laterally from the vehicle 10 and less forward) to provide fields of view comparable to fields of view 43b and 44b, respectively.

Also, according to an aspect of Applicant's invention, the cameras are positioned such that they provide fields of view to satisfy the requirements of federal regulation, including Regulation FMVSS 111 for schoolbuses, so that the vehicle may be used without any external mirrors positioned on the outer walls of the vehicle 10. Accordingly, the driver may be provided a system that requires never having to look outside of the driver's cabin to discern passersby and passengers outside of the vehicle. Alternatively, the system according to the present invention may be used to augment a system of exterior mirrors or a single mirror.

Also, while the monitors 31, 32, 36 and 37 are shown as individual units located above the dashboard 30, they may be positioned on top of the dashboard 30 or maybe embedded in or formed integrally with the dashboard 30. Additionally, while monitors 31, 32, 36 and 37 are shown as individual units, they may be configured as one large monitor providing a display provided by all of the monitors as above-described. According to such an embodiment, various portions of the unified monitor (not shown) would be permanently dedicated to displaying a view corresponding to the displays 61, 66, 62, and 67 as above-described.

Although the present disclosure has been described in relation to particular embodiments thereof, many other variations, modifications, combination of features, and other uses will become apparent to those skilled in the art. It is preferred, therefore, that the present disclosure be limited not by the specific disclosure herein, but only by the appended claim.

The invention claimed is:

1. A vehicle-borne camera observation system for monitoring areas adjacent a vehicle, the system comprising:
   a plurality of cameras positioned at the vehicle and operable to provide a predetermined field of view around the vehicle, including a first camera positioned to have a first field of view, and a second camera positioned to have a second field of view;
   a system for illuminating at least one of the first and second fields of view around the vehicle providing a light source; and
   at least one monitor configured for displaying a plurality of views, positioned in a driver's area of the vehicle and operable to display the fields of view of the plurality of cameras;
   wherein the at least one monitor automatically switches between displaying of at least one of the first and second fields of view to another of the first and second fields of view based on operation of a control of the vehicle.

2. The system of claim 1, wherein
   the first camera is a right rear camera provided adjacent a right rear corner of the vehicle joining a rear side and a right side of the vehicle, such that the right rear camera is oriented forward and to the right side of the vehicle; and
   the second camera is a left rear camera positioned adjacent a left rear corner of the vehicle joining the rear side and a left side of the vehicle, the left rear camera oriented forward and to the left side of the vehicle.

3. The system of claim 1, wherein
   the first camera is a right front camera positioned adjacent a corner of the vehicle joining a front side and the right side of the vehicle, the right front camera oriented rearward and to the right side of the vehicle; and
   the second camera is a left front camera positioned adjacent a corner of the vehicle joining the front side and the left side of the vehicle, the left front camera oriented rearward and to the left side of the vehicle.

4. The system of claim 1, wherein the system for illuminating the field of view around the vehicle further comprises an infrared illumination source provided for at least one camera of the plurality of cameras, to provide a night vision system displayed on the at least one monitor.

5. The system of claim 1, wherein the at least one monitor is operable to provide a driver selection between displaying an output of the first camera of the plurality of cameras and displaying an output of the second camera of the plurality of cameras.

6. The system of claim 1, wherein each camera of the plurality of cameras is provided with electronic circuitry to filter out excessive lighting.

7. The system of claim 1, wherein the first camera is a forward-view camera positioned on a front side of the vehicle and the first field of view includes an area in front of the vehicle.

8. The system of claim 1, wherein each camera of the plurality of cameras is positioned and configured to break away without damaging the vehicle in response to sudden impact.

9. The system of claim 1, wherein each camera of the plurality of cameras is positioned and configured to swing and rebound in response to sudden impact.

10. The system of claim 1, further comprising a control system which modifies an arrangement of images on the plurality of monitors based on whether the vehicle is parked during a period when children embark or disembark from the vehicle and other periods when the vehicle is being driven.

11. The system of claim 1, further comprising a processor which is capable of detecting the movement of children around the vehicle while the vehicle is taking on or discharging the children.

12. The system of claim 11, wherein the children moving around the vehicle are depicted in a sharp color while stationary images or images of fast moving adjacent vehicles are depicted in black, white or grey, while the moving children are depicted in a sharp color.

13. The system of claim 11, wherein the detection is via a forward-looking infrared, an infrared laser, or a LADAR system.

14. The system of claim 11, wherein the at least one monitor is further configured for displaying the movement of children around the vehicle in a color different than other objects in the at least one of the first and second fields of view.

15. The system of claim 11, wherein the first camera is a forward-view camera positioned on a front side of the vehicle and the first field of view includes an area in front of the vehicle.

16. The system of claim 1, further comprising a control system which modifies an arrangement of images on the plurality of monitors responsive to predetermined criteria.

17. The system of claim 1, further comprising a processor which is capable of detecting the movement around the vehicle while the vehicle is taking on or discharging children.

18. A school bus-borne camera observation system for monitoring an area adjacent the school bus, the system comprising:
   a plurality of cameras positioned at the school bus and operable to provide a view of areas adjacent the school bus, including in front and along the sides thereof, including a first camera positioned to have a first field of view and a second camera positioned to have a second field of view;
   a system for illuminating the areas around the school bus providing a light source to improve visibility of children moving around the school bus during periods of low visibility; and
   a plurality of monitors positioned in a driver's area of the school bus and operable to display images provided by the plurality of cameras including a first monitor and a second monitor;
   wherein at least one of the first and second monitors automatically switches between displaying of at least one of the first and second fields of view to another of the first and second fields of view based on operation of a control of the vehicle.

19. The system of claim 18, wherein the illumination system further utilizes infrared radiation.

20. The system of claim 18, including a control system which modifies an arrangement of images on the plurality of monitors based on whether the school bus is parked during a period when children embark or disembark from the school bus and other periods when the school bus is being driven.

21. The system of claim 18, including a processor which detects the movement of children around the school bus while the school bus is taking on or discharging the children and which depicts images of the children moving around the school bus in a color different than all other colors in the images.

22. The system of claim 21, wherein the children moving around the school bus are depicted in a sharp color while stationary images or images of fast moving adjacent vehicles are depicted in black, white or grey, while the moving children are depicted in a sharp color.

23. The system of claim 21, wherein the detection is via a forward-looking infrared, an infrared laser, or a LADAR system.

24. A vehicle-borne camera observation system for monitoring areas adjacent a vehicle, the system comprising:
   a plurality of cameras comprising a forward view camera positioned to have a first field of view including an area in front of the vehicle, a right view camera positioned to have a second field of view including an area along a right side of the vehicle, a left view camera positioned to have a third field of view including an area along a left side of the vehicle, and a back view camera positioned to have a fourth field of view including an area behind the vehicle;
   a system for illuminating the areas around the vehicle providing a light source; and
   a plurality of monitors positioned in a driver's area and operable to display all of the fields of view from the plurality of cameras, the plurality of monitors including a first monitor operable to provide driver selection between displaying only the first field of view and the fourth field of view; and
   wherein the first monitor automatically switches between displaying the first field of view and the fourth field of view based on a driver operation of a control for moving the vehicle.

25. The system of claim 24, wherein the plurality of monitors further comprises:
   a second monitor operable to display the second field of view; and
   a third monitor operable to display the third field of view.

26. The system of claim 25, wherein the second monitor is positioned to the right hand side with respect to the driver's area of the first monitor, and the third monitor is positioned to the left hand side with respect to the driver's area of the first monitor.

27. The system of claim 24, wherein the first field of view includes an area immediately adjacent the vehicle, including a driver blind spot.

28. The system of claim 24, wherein the second field of view and the third field of view each include an area immediately adjacent the vehicle.

29. The system of claim 24, wherein the plurality of cameras further comprises a cabin rear view camera positioned inside the vehicle to include an interior view including an area inside the vehicle posterior to the driver's area, and
   wherein the plurality of monitors further display the interior field of view including the area inside the vehicle.

30. The system of claim 24, wherein the system provides all fields of view as required by U.S. regulation for school buses without use of any mirrors positioned on an exterior of the vehicle.

31. The system of claim 24, wherein the system provides all fields of view set forth in U.S. regulation FMVSS 111 for school buses.

32. The system of claim 24, wherein each camera of the plurality of cameras is fixedly attached with respect to the vehicle in a stationary position and provides an unadjustable field of vision.

33. The system of claim 24, wherein each monitor of the plurality of monitors is positioned above a dashboard of the vehicle.

\* \* \* \* \*